F. W. OFELDT.
Gas-Apparatus for Carbureting Air.
No. 162,848.
2 Sheets--Sheet 2.
Patented May 4, 1875.
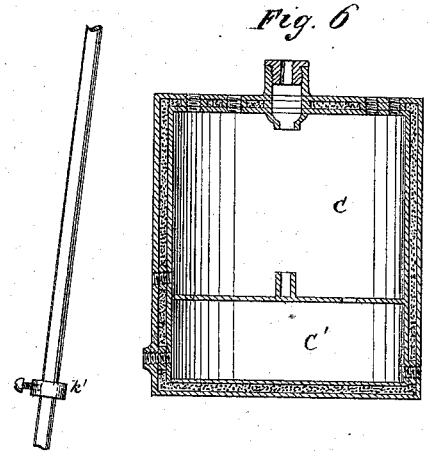
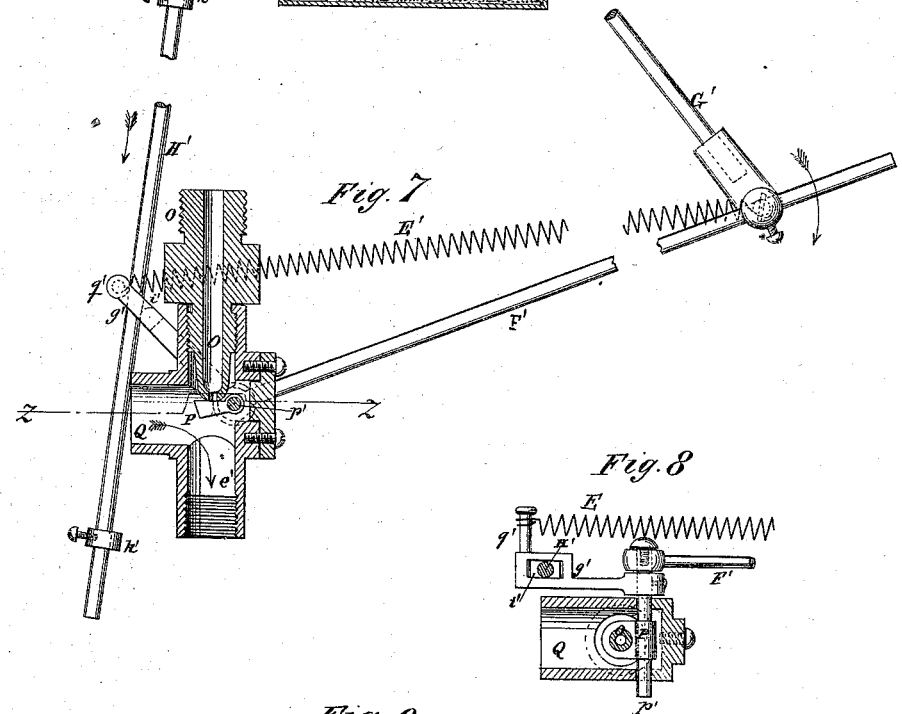
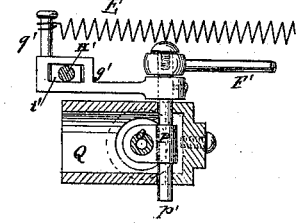
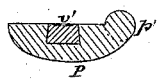
Witnesses:
Wm. A. Hopper
James H. King
Inventor:
F. W. Ofeldt

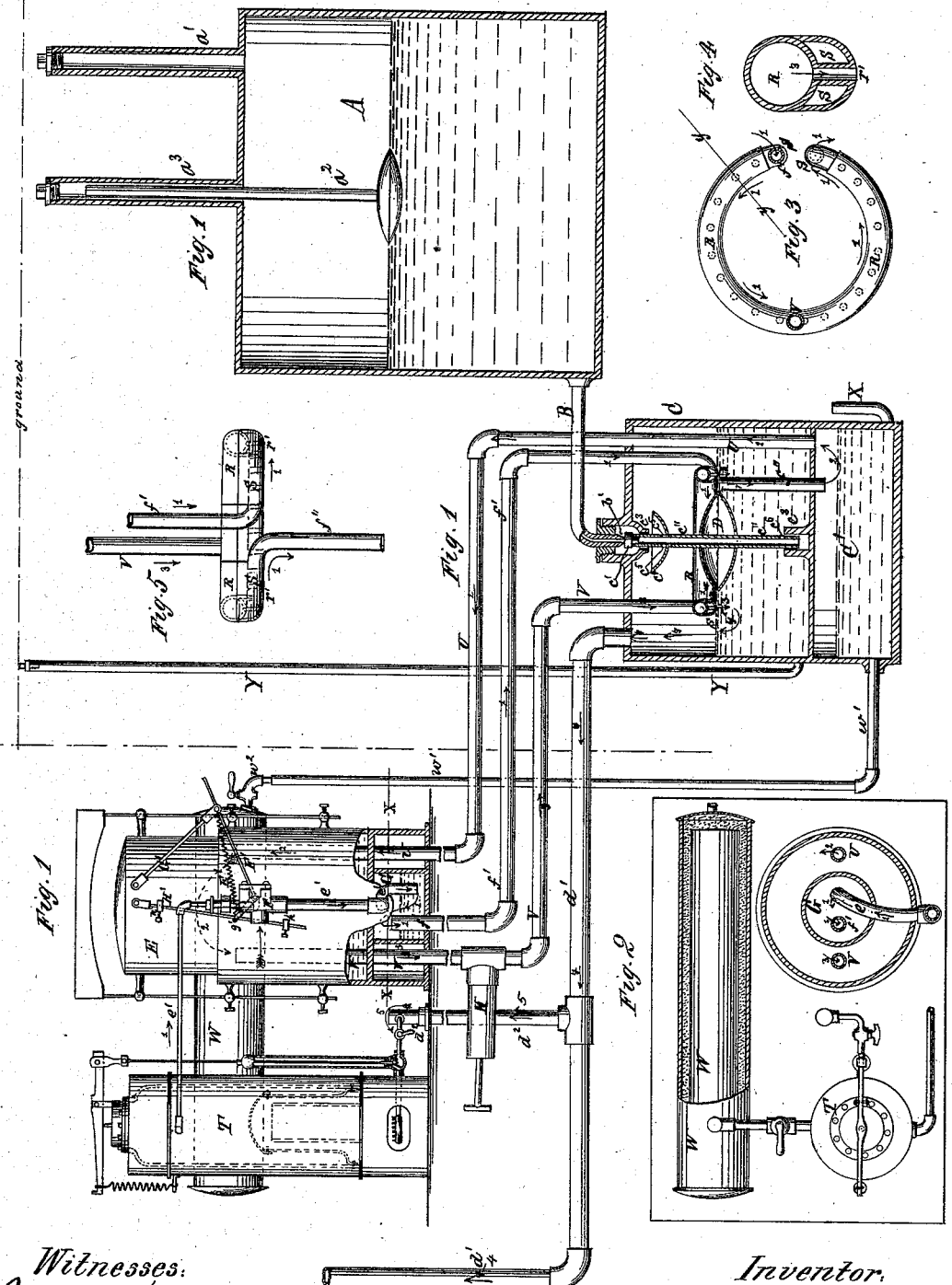

UNITED STATES PATENT OFFICE.

FRANK W. OFELDT, OF NEWARK, NEW JERSEY, ASSIGNOR TO HIMSELF AND GEORGE W. HALL, OF SAME PLACE.

IMPROVEMENT IN GAS APPARATUS FOR CARBURETING AIR.

Specification forming part of Letters Patent No. 162,848, dated May 4, 1875; application filed October 10, 1874.

*To all whom it may concern:*

Be it known that I, FRANK W. OFELDT, of the city of Newark, in the county of Essex, State of New Jersey, have invented certain Improvements in Gas Apparatus, of which the following is a specification:

My invention relates to that class of gas-machines in which the gas is formed by vaporization of gasoline or other volatile hydrocarbons, the improvements being specially made with reference to a former patent granted to me September 17, 1872, and numbered 131,369; and it consists, first, in the combination of parts, whereby a gasometer proper is dispensed with, and the pressure on the gas is regulated by an aerometer in which no gas ever enters; secondly, in the mechanism whereby the air is thoroughly dried and heated before mingling with gasoline for vaporizing it; thirdly, in other mechanism and combination of various elements, as will be hereinafter described, reference being had to the accompanying drawings, in which—

On Sheet 1, Figure 1 represents an elevation, partly in section, of a gas-machine of thirty lights capacity, embodying my present invention, its several parts being arranged in their relative positions as when in actual use. Fig. 2 is a top view, partly broken out and partly in section, through the line $x$ $x$ of Fig. 1. Fig. 3 is a detail plan view of the air-heating device in the gas-generating tank. Fig. 4 is a detail cross-section of the same, taken through the line $y$ $y$ of Fig. 3. Fig 5 is an edge or side view of the same. Fig. 6 (on Sheet 2) is a vertical section of a modified construction of the generator; Fig. 7, a vertical section of the steam-injector. Fig. 8 is a cross-section of the same through the line $z$ $z$ of Fig. 7. Fig. 9 is a detail cross-section of the injector-valve proper.

Similar letters of reference indicate corresponding parts in the different figures.

A is the oil-reservoir, placed under ground, and provided with the supply-pipe $a'$ and float-gage $a''$, the height of which latter, measured in the pipe $a^3$, determines the quantity of oil contained in the reservoir A. B is the oil-supply pipe to the generator C. This tank C has an upper compartment for oil, and a lower one, C', for water formed by the condensation of steam. The tanks A and C are placed as seen in the drawing, so that the pipe B may run horizontally from the lower part of the reservoir A to the upper part of the tank C. The tanks A C I prefer to provide with double walls, as shown in Fig. 6 on Sheet 2, the space between which I fill with non-conducting material, in order to maintain an even temperature of the oil uninfluenced by atmospheric changes. The pipe B, in entering the tank C, is bent downward and tapered or rounded off on its extreme end at $b'$, so as to form a small annular surface or valve-seat for contact with the oil-supply valve $c'$, which latter is simply a cork inserted in the pipe or stem $c''$ of the float D, and is, by the buoyancy of the said float, kept up against the end $b'$ of the pipe B, thus serving as a valve for regulating the oil-supply to the tank C by the movements of the float D, in such a manner that the oil never can rise above the level necessary to close the valve $b'$ $c'$ by the buoyancy of the said float D. The stem $c''$ of the float D is guided in always the same perpendicular position by being fitted loosely in steps or guides $c^3$, as shown in Fig. 1. $c^4$ is a cup surrounding the hollow stem $c^2$ of the float D, into which cup the oil overflowing the cork valve $c'$ will descend and enter the hollow stem $c''$ through the holes $c^5$, and thence, through the stem $c''$ and the holes $c^6$, (or the lower step $c^3$,) commingle with the oil remaining in the oil-space of the tank C.

When, by vaporization of oil in the tank C, the float D has descended enough to open the valve $b'$ $c'$, oil from A will flow through the pipe B, and, overflowing the top of the cork valve $c'$, will discharge into the cup $c^4$, pipe $c''$, and tank C, raising the level of the oil until the rising of the float D again closes the valve $b'$ $c'$.

By this simple construction all stuffing-boxes and packings are dispensed with, the oil-level is regulated with the utmost exactness, and the quantity supplied exactly according to the vaporization needed to supply with gas any number of burners used, and a reliable valve is effected, which will not get out of order.

Instead of the cork $c'$, other materials might answer; but cork is preferable, being elastic, and not affected by the chemical action of gasoline.

The air-heating device in the generator consists of two hollow rings or otherwise-shaped vessels, R S, the upper one of which, R, is provided with a number of small tubes, $r'$, which go through the lower one, S, and both rings joined air-tight together, so as to form one vessel of two compartments; or, in other words, it consists of a vessel divided by one or more horizontal partitions in two compartments, R S, a series of small tubes, $r'$, running through the partition and the lower compartments S, and thus connecting the upper compartment R with the exterior, (the oil-surface,) while separating it from the lower compartment. The vaporized oil (the gas) rises from the tank C, through the service-pipe $d^1$, directly to the burners in the building without ever entering the aerometer E, a small pipe, $d^2$, branching off from the service-pipe $d^1$ to supply fuel under the boiler. Air-supply and sensible heat to compensate for that made latent by vaporization of gasoline is furnished by steam from the boiler T (fully described in my patent of October 8, 1872, No. 131,966,) said steam entering, through the pipe $e'$ and the injector F, (to be hereinafter described,) into a vessel, G, containing water, and placed underneath the aerometer E, the pipe $e'$ reaching with its lower end below the surface of the water.

The steam, drawing with it through the air-pipe Q of the injector F a large quantity of air, rises, after leaving the pipe $e'$, above the water in the vessel G, and there enters the pipe $f'$, through which it passes into the tank C and the vessel S, there heating the vessel R and the whole series of small tubes $r'$, and finally descending through the pipe $f''$ into the lower partition C' of the tank C, where the steam is condensed. The air, heated by and freed from steam, rises through the pipe U to the aerometer E, (which is simply a cylindrical vessel inverted in a similar vessel containing water, and working on the principle of an old-fashioned gasometer,) causing the upper part thereof to rise and operate the injector-valve, as also by its weight to maintain a uniform pressure on the air, and thereby also on the gas in the service-pipe. From the aerometer E the air passes through the pipe V back again to the generator C, where it enters the vessel R, and becomes reheated by the steam entering the vessel S from the pipe $f'$, and at last, thoroughly dried and heated, passes through the series of small pipes $r'$ to the surface-film of the gasoline, vaporizing the latter, and finally passing as gas to the service-pipe $d^1$.

The passage of steam, air, and gas is indicated by arrows on the drawing, arrow 1 indicating the passage of steam from the boiler to the injector, as also the passage of mixed air and steam from the injector, through the gasoline in the generating-tank C, (where the steam gives off its heat,) to the lower compartment C' of the tank C, where the water resulting from condensation collects. Arrow 2 indicates the passage of the heated air, after the condensation of the steam, from C' to and into the aerometer E. Arrow 3 indicates the return of the same air from the aerometer to the generator, where it enters the vessel R, and is reheated by the steam passing through the pipe $f'$ and vessel S, in direction of arrow 1, and, coming in contact with the surface of the gasoline through the small tubes $r'$, vaporizes gasoline, and thus finally forms gas, which, on being formed, passes through the service-pipe $d^1$ in the direction of arrow 4, a small portion going through the branch pipe $d''$ in direction of arrow 5 to heat the boiler.

By condensation in the water-vessel G of steam from the pipe $e'$, the water-level is kept at or about the height of the upper end of the pipe $f'$, through which it will flow down if in excess.

The upper end of the pipe $f'$ being above, and the lower end of the pipe $e'$ below, the water-surface in the vessel G, no air can return from the pipe $f'$ to the pipe $e'$, and escape again through the injector F and pipe Q, the valve of which needs not, therefore, to be made tight in this direction, as heretofore, thereby rendering unnecessary an amount of friction to encumber the movements of the aerometer. H is a hand-pump for supplying air through the pipe V, vessel R, and pipes $r'$ to the oil-surface in the tank C, to give the first start for heating the boiler and operating the aerometer.

The injector F is operated by the motion of the aerometer E, by means of the arm F', lever $g'$, spring E', and rods G' H', as described in my former patent, No. 131,369. Instead of the slotted rod H', described in the said patent, this present rod H' is simply a straight wire, not slotted, but sliding in a slot or hole, $i'$, through the handle or lever $g'$ of the injector-valve, and tripping the latter by means of the stops $k'$, adjustable by set-screws on the rod H', and made too large for passing through the hole $i$ in the lever $g'$, therefore tripping the valve when coming in contact with the lever $g'$ by the rising or falling of the aerometer.

The injector F I have improved by constructing it in the following manner: The steam-nozzle O is threaded a distance sufficient to allow of adjusting its position relative to that of the valve proper P, and its lower end is tapered, and the lower edge thereof slightly rounded off to form the valve-seat. The valve proper P is of the kind known as clack-valves, the hinge or shaft $p'$ of which has its bearing in and projects outside of the injector F, the handle or lever $g'$ being secured on the extended portion, the extreme end of which serves as fulcrum for the movements of the arm F' in tripping the valve-reversing spring E', which latter is attached with one end to the free end of the arm F', and with the other end to a pin, $q'$, on the free end of the valve-lever $g'$. By drilling not quite through the valve P I form a socket, which I fill with tin, lead, or similar soft metal, $v'$, filing it even and smooth on its upper side. After inserting the valve P and nozzle O in their proper positions, with the face of $v'$ resting against the end of the nozzle O, I fit the valve to the exact shape of the edge of the nozzle simply by applying a pressure or blow on the lower side of the valve P, against the end of the nozzle O, whereby is formed a cavity in $v'$ exactly corresponding to the edge of the nozzle O. The downward current of steam through the nozzle O draws with it a large amount of air through the short pipe Q in the usual manner.

The boiler T (or the felt-covered double tank or vessel W, communicating with the steam and water spaces of the boiler) is connected with the condensing-tank C' by a pipe, $w^1$, so that when, by cooling of the vessel W, or by opening of the cock $w^2$ on the pipe $w^1$, the steam is allowed to condense, the atmospheric pressure will cause the water in tank C' to return to the boiler, and thus to be used over again indefinitely for making steam.

X is an overflow-pipe to prevent the water in tank C' from reaching the pipe $f''$, and to allow the air to pass off unimpeded to the pipe U. The pipe Y is for the purpose of pumping out sediments and gasoline, when desired, from the generator C.

Having thus described my invention, what I claim as new, and desire to secure by Letters Patent, is—

1. The combination of pipes $f'$ U V $d^1$ with an oil-tank or gas-generator, C, and an aerometer, E, whereby a current of air carried by a current of steam through the generator will, liberated from steam, enter the aerometer, and on its return thence to the generator, reheated by the repeated primary current of steam, cause the oil to vaporize, and in the form of gas to pass directly to the service-pipe, so that the aerometer, without ever receiving any gas, will cause and maintain the gas-pressure, and a gasometer is dispensed with, substantially as specified.

2. The combination of the pipes $f'$ $f''$, passing through the oil in the generator into the condensing-tank C', with the pipe U, for the purposes of heating the oil without getting it mixed with water from condensation, separating the steam and air by condensation, and collecting the former, condensed, in the tank C', and returning the liberated air by the pipe U to the aerometer E, substantially as specified.

3. The annular vessel composed of compartments R and S, one of which is provided with tubes $r'$, passing through the other, for the purpose of heating a current of air passing through the former by a current of steam passing through the latter, in order to promote and maintain the formation of gas in a generator, C, substantially as specified.

4. The cup $c^4$, in combination with the hollow stem or pipe $c''$, provided with holes $c^5$, as shown, for the purpose of bringing the supply to the bottom of the generator, substantially as specified.

5. The pipe $w^1$, in combination with the water-tank W of the boiler T, and the condensing-tank C', for returning the condensed steam to the boiler, substantially as specified.

6. The air-pump H, in combination with the pipes V $d^1$ $d^2$, generator C, boiler T, and aerometer E, for starting the machine, substantially as specified.

F. W. OFELDT.

Witnesses:
CYRUS BENEDICT,
D. LAUCK.